UNITED STATES PATENT OFFICE.

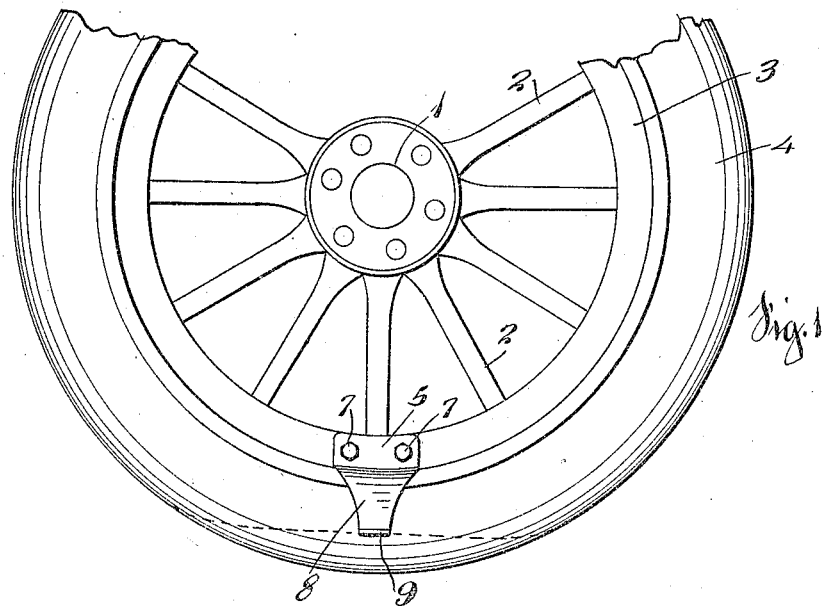
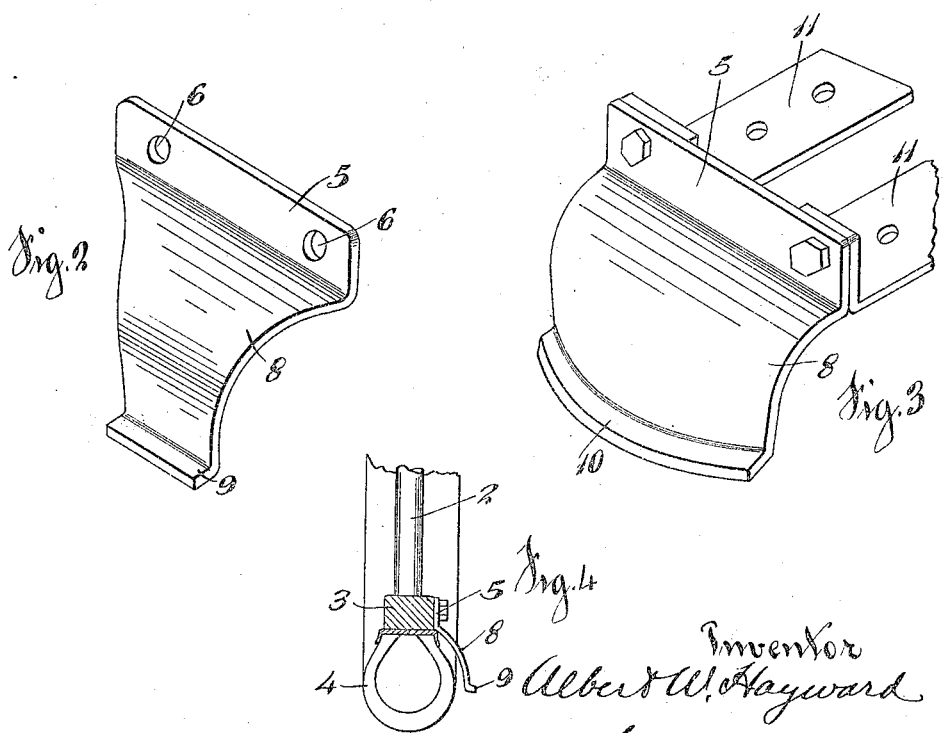

ALBERT W. HAYWARD, OF CINCINNATI, OHIO, ASSIGNOR TO DORA S. HAYWARD, OF CINCINNATI, OHIO.

TIRE-PROTECTOR DEVICE.

1,305,101.  Specification of Letters Patent.  Patented May 27, 1919.

Application filed November 24, 1917. Serial No. 203,714.

*To all whom it may concern:*

Be it known that I, ALBERT W. HAYWARD, a citizen of the United States, and a resident of Cincinnati, in the county of Hamilton and State of Ohio, have invented certain new and useful Improvements in Tire-Protector Devices, of which the following is a full, clear, and exact description, reference being had to the accompanying drawing, forming part of this specification.

My invention relates to devices for giving a warning to the driver of a vehicle having pneumatic tired wheels to indicate when the tires of said wheels have become so deflated as to render their continued use dangerous.

As is well known, the greatest factor of wear in pneumatic tires is the running of them while partially or entirely deflated. When the tire is entirely deflated, even a few turns of the wheel beneath a heavy vehicle will tear the casing and tubes of a practically new tire so badly as to make their repair unadvisable. When the tire is but partially deflated, the weight of the vehicle puts a much greater strain on the composition of the casing, so that the plies of fabric get loose on each other, and finally crack and break, and the tire deteriorates rapidly.

It is the object of my invention to provide an attachment for the wheels of vehicles employing pneumatic tires which will give a warning to the driver as soon as the tire gets so low as to render its further operation improper.

I am aware that in the past, devices have been placed on the wheels of such vehicles, which contact with the ground as the wheels revolve thereon, and set off some sort of sound or alarm. So far as I am aware, however, these devices have been yieldable and when the deflation on the tire permitted them to come into contact with the roadway, have been forced up so as to ring a bell or blow a whistle, or in some other way sound an alarm.

The principle of my device is quite different from these since it is my object more especially to provide on the rim of the wheel a non-depressible member of sufficient strength to support the weight of the vehicle, which projects outwardly alongside of the tire. When the tire becomes deflated, then this member bumps along on the ground, jarring the vehicle in such a way that the warning cannot pass unheeded.

There is no necessity for springs, signals and other complicated mechanism, which would be bound to be ruined at the first blow on a pavement, as more effective work will be done by one small plate of sufficiently heavy metal, detachably secured to the rim of the wheel and projecting downwardly along the tire.

The above objects and advantages I accomplish by that certain construction and arrangement of parts to be hereinafter more specifically pointed out and claimed.

In the drawing;

Figure 1 is a side elevation of a wheel and tire, showing one of my warning plates attached.

Fig. 2 is a perspective of one of the plates.

Fig. 3 is a perspective of another of the plates, indicating partly a method of attachment for wire wheels.

Fig. 4 is a section taken through the rim and tire on a wheel, showing the plate edgewise.

The wheel shown has a hub 1, spokes 2 and a felly 3. On the felly is mounted the rim and the pneumatic tire 4. But two shapes of the plate are shown for purpose of illustration here, but it will be understood that such variations of shape of plate and method of attachment of the same, as may be desired, are all intended to be covered as within the spirit and teachings of my invention. The essentials of the plates, as I understand the invention at this time, are that they should have some method of attachment to the wheel, and should extend outwardly, to clear the side of the tire, and terminate at a point, inside of the natural position of the tread of the tire when properly inflated. Also they should be strong enough to support the weight of the vehicle.

Thus the plates used for illustration have a flange 5, provided with proper holes 6 to receive securing bolts 7. The bolts 7 take into the felly of the wheel. The plates then have the curved web 8 which extends outwardly from the felly, and stays well clear of the tire. The end of the web 8 may be turned over to form a sort of foot as at 9 (Fig. 2), or it may be curved in some desired manner as at 10 (Fig. 3), so as to form a rolling contact with the ground, should it come into play.

Preferably the plates should be mounted on the felly at a point opposite to the valve stem of the tire, thereby giving a perfect counterbalance to the stem, although this detail may not be found at all necessary. Only one plate is necessary on each wheel and it should be at the inside of the wheel, so as to be out of sight and not in a position to strike a curb.

Should wire wheels be used where there is no felly of sufficient body to receive securing bolts, I make use of a pair of sprocket plates 11, 11. (Fig. 3.) These brackets are riveted or bolted to the under side of the felly plate between the wire spokes, and the contact plate is secured to the brackets by bolts in the usual way.

The contact plate will never come into play unless the tire is so deflated as to make its use in such condition harmful, and then the edge of the plate will come into contact with the road surface and give a bumpy motion to the entire vehicle which cannot fail to be noticed. Should it become necessary to run on a rim alone or a flat tire, due to emergency, then the plate on the injured tire can be readily unbolted.

Should the vehicle get into such a position that the plate could contact with the road, as where the tire would sink in a deep rut, then the plate would be an advantage to the operation of the car as it would tend to lift the vehicle up.

It would be possible to combine the rigid contact plate of my invention with one of the many forms of securing lug for demountable rim tires in automobile use today, although I do not consider it necessary to show any such modification of my invention and make no claim on the combination with a tire lug as a specific embodiment of the invention herein.

Also a use of the rigid contact plate idea with a plate irremovably mounted on the wheel would respond to the essential feature of the invention, although I would not consider anything but a removable plate as being desirable for use under conditions with which I am familiar.

Having thus described my invention, what I claim as new and desire to secure by Letters Patent, is:—

1. The combination with a pneumatic tire and a wheel therefor, of a rigid plate secured to the wheel and of a conformation to lie out of contact with the tire, said plate having a length to position its end intermediate the tread and rim of the tire, and said plate having a width adapted to raise sharply the entire wheel when the tire is sufficiently deflated to permit the end of said plate to contact with the ground.

2. The combination with a pneumatic tire and a wheel therefor, of a rigid plate secured to the wheel and curved in an arc greater than that assumed by the tire in inflated or partially deflated position, said plate having a length to position its end intermediate the tread and rim of the tire, and said plate having a width adapted to raise sharply the entire wheel when the tire is sufficiently deflated to permit the end of said plate to contact with the ground.

3. The combination with a pneumatic tire and a wheel therefor, of a rigid plate secured to the wheel and of a conformation to lie out of contact with the tire said plate having a length to position its end intermediate the tread and rim of the tire, and said plate having a width adapted to raise sharply the entire wheel when the tire is sufficiently deflated to permit the end of said plate to contact with the ground, said end of said plate being formed with a foot for contact with the ground.

ALBERT W. HAYWARD.